Figure 1:
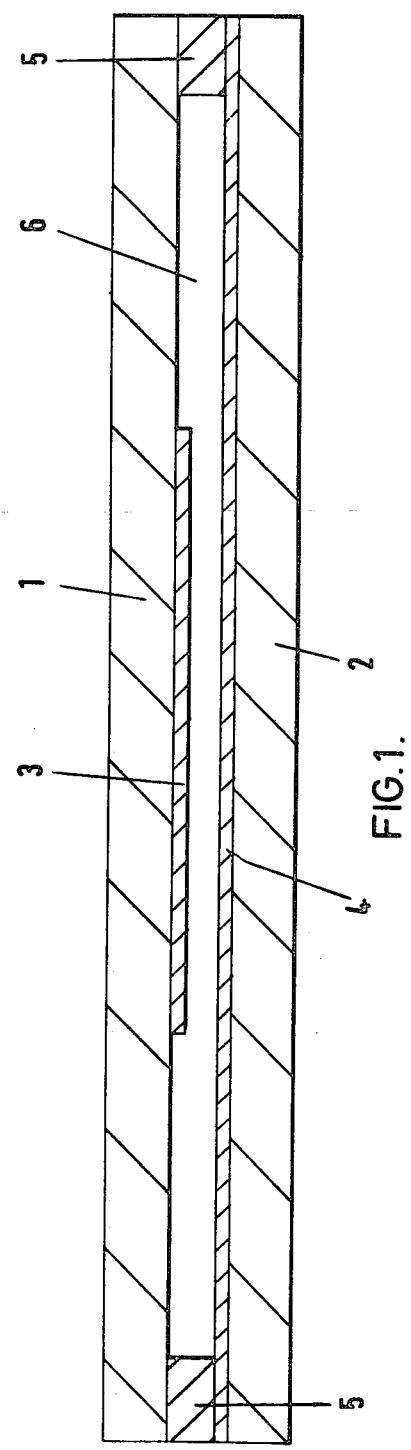

United States Patent [19]

Crossland et al.

[11] 4,139,273
[45] Feb. 13, 1979

[54] METHOD FOR PREPARING AND OPERATING A SMECTIC LIQUID CRYSTAL DISPLAY CELL HAVING INDEFINITE STORAGE PROPERTIES

[75] Inventors: William A. Crossland, Harlow; Joseph H. Morrissy, Dunmow; Barbara Needham, Harlow, all of England

[73] Assignee: International Standard Electric Corporation, New York, N.Y.

[21] Appl. No.: 754,780

[22] Filed: Dec. 27, 1976

[30] Foreign Application Priority Data

Jan. 6, 1976 [GB] United Kingdom ............... 00316/76

[51] Int. Cl.$^2$ ................................................ G02F 1/13
[52] U.S. Cl. .................................... 350/340; 350/350; 252/299
[58] Field of Search ................ 350/160 LC, 340, 350; 252/299

[56] References Cited

U.S. PATENT DOCUMENTS

| | | | |
|---|---|---|---|
| 3,716,289 | 2/1973 | Creagh et al. | 350/160 LC |
| 3,796,999 | 3/1974 | Kahn | 350/160 LC X |
| 3,803,050 | 4/1974 | Haas et al. | 252/299 |
| 3,947,375 | 3/1976 | Gray et al. | 252/299 |

OTHER PUBLICATIONS

Hareng et al. "Electric Field Effects on Biphenyl Smectic A Liquid Crystals", Applied Physics Letters, vol. 25, pp. 683-685, Dec. 15, 1974.
Hareng et al., "Planar-to-Homeotropic Structure Transition under Electric Field in A-phase Smectic," Applied Physics Letters, vol. 27, pp. 575-576, Dec. 1, 1975.

*Primary Examiner*—Edward S. Bauer
*Attorney, Agent, or Firm*—John T. O'Halloran; Peter C. Van Der Sluys

[57] ABSTRACT

A method for preparing and operating dynamic scattering liquid crystal display cells having internal electrodes and containing a smectic liquid having positive dielectric anisotropy and incorporating a homeotrophic alignment inducing medium for the smectic liquid filling. The cell can be switched off to make the transition from dynamic scattering to static scattering for providing indefinite storage properties.

4 Claims, 3 Drawing Figures

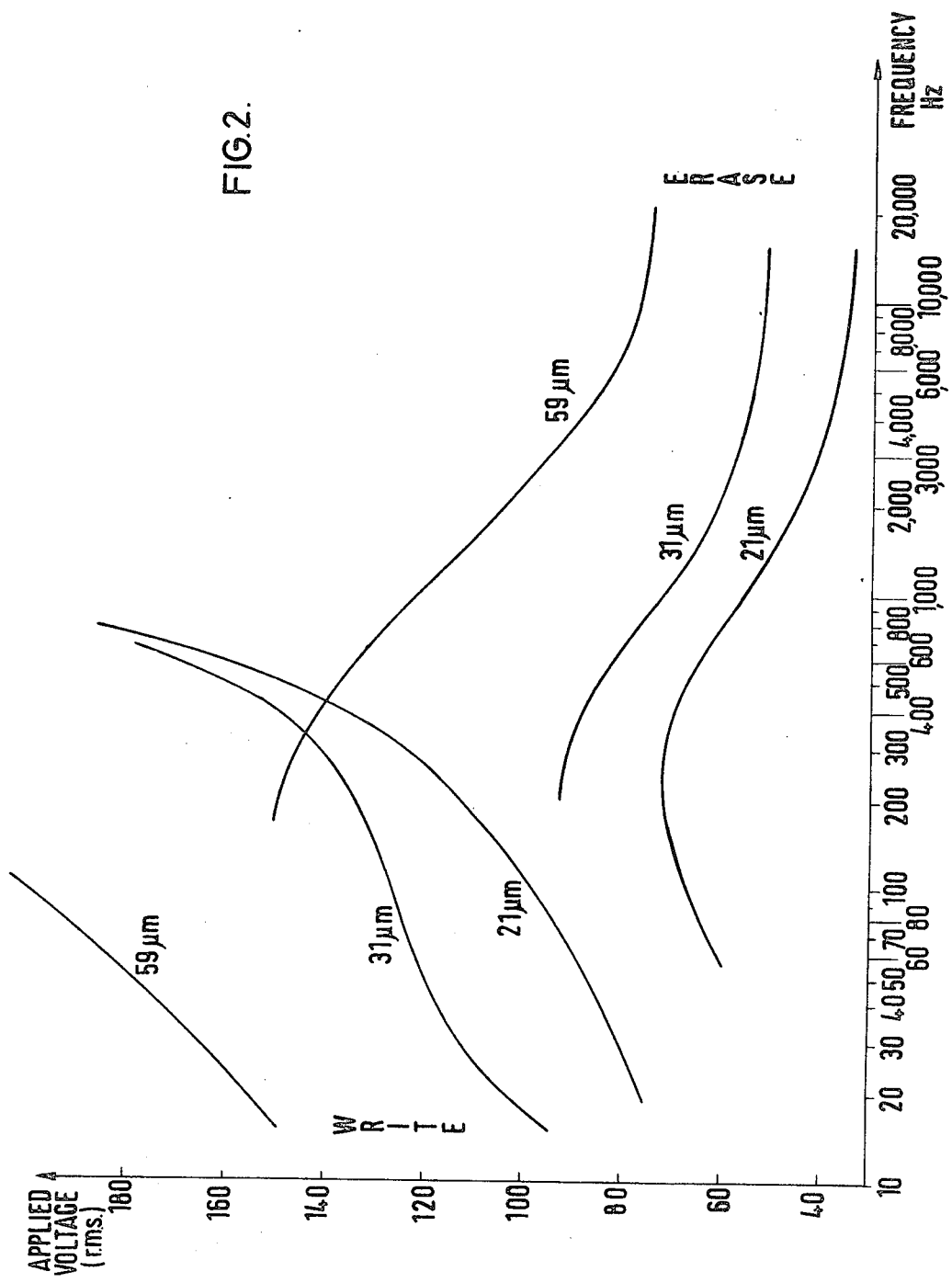

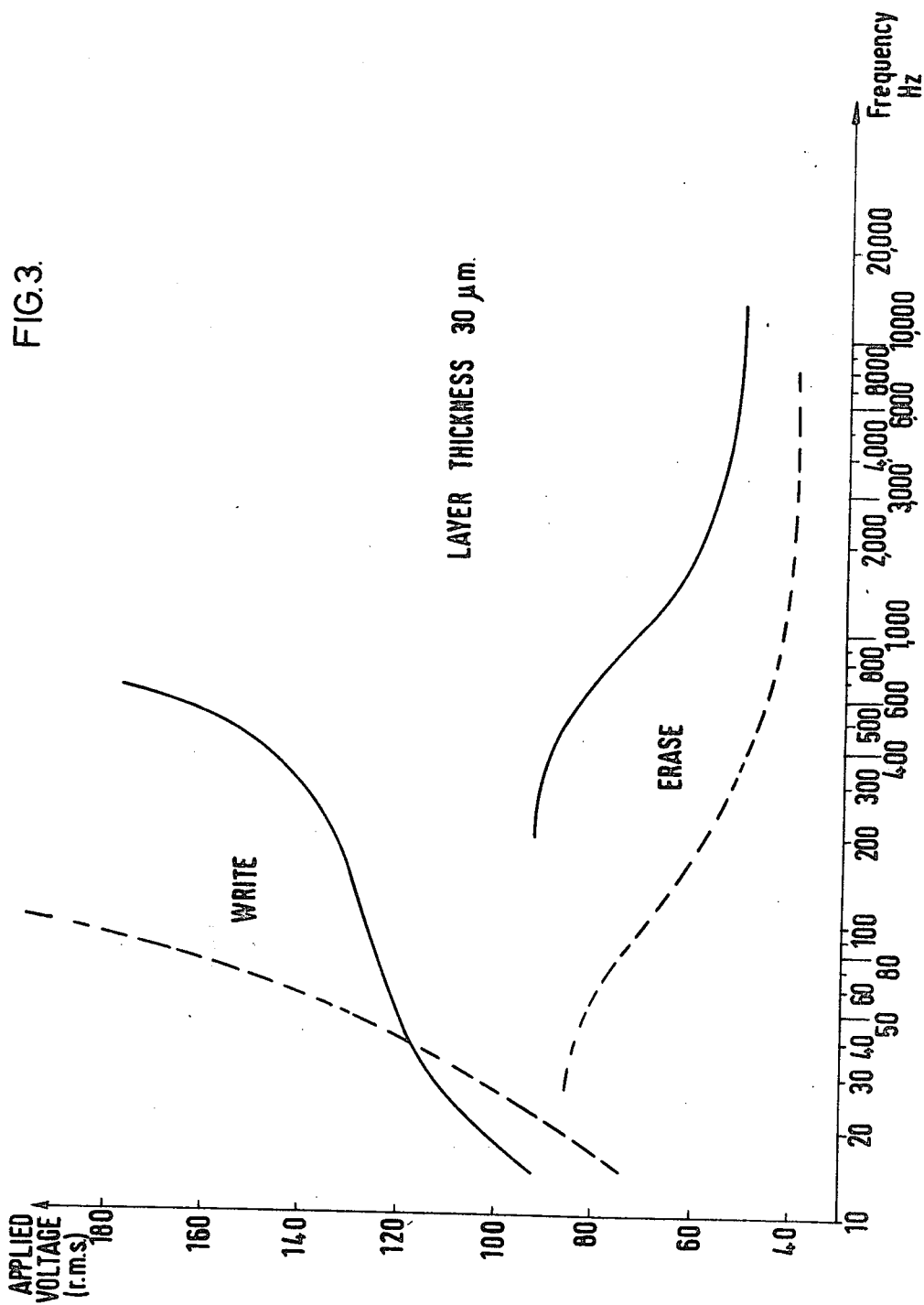

METHOD FOR PREPARING AND OPERATING A SMECTIC LIQUID CRYSTAL DISPLAY CELL HAVING INDEFINITE STORAGE PROPERTIES

This invention relates to dynamic scattering liquid crystal display cells.

According to the present invention there is provided a dynamic scattering liquid crystal display cell provided with internal electrodes and filled with a smectic liquid having positive dielectric anisotropy and incorporating a homeotropic alignment inducing medium for said smectic liquid filling.

The structure of such a cell has a number of similarities with that of a dynamic scattering nematic liquid crystal display cell, and hence techniques developed for making the nematic type of display cell may also be applied with little or no adaptation to the construction of the smectic type of display cells.

It should be noted that whereas a dynamic scattering nematic liquid crystal display cell employs a nematic material with negative dielectric anisotropy, a dynamic scattering smectic liquid crystal display cell according to the present invention employs a smectic material with positive dielectric anisotropy. Both types of cell have homeotropic alignment in their unenergised state and become turbid in the presence of an applied electric field. It is believed that a negative dielectric anisotropy is required in the nematic case because the direction of greatest electrical conductivity lies in the direction of the molecular axis, and that a positive dielectric anisotropy is required in the smectic case because the electrical conductivity is least in this direction.

A feature of the dynamic scattering smectic liquid crystal display cell is that is can be operated in manner to provide electrically reversible storage. Under these circumstances, when the power is removed, the region or regions that were scattering as a result of dynamic (turbulent) scattering remain scattering, but the scattering mode is changed from the dynamic scattering mode into the static, focal-conic, scattering mode.

There follows a description of dynamic scattering smectic liquid crystal display cells embodying the invention in preferred forms. The description refers to the accompanying drawings in which:- FIG. 1 depicts a schematic cross section through one of the cells, and FIGS. 2 and 3 are graphs depicting frequency dependence of switching thresholds.

Two glass plates 1 and 2 are provided with transparent electrodes 3 and 4, for instance the indium-tin oxide, in the manner conventionally used for providing such electrodes for nematic dynamic scattering display cells. In one preferred form of the cell the electroded surfaces of the two plates are then coated with hexadcyl trimethyl ammonium bromide, a polar surfactant commonly used to provide homeotropic alignment in nematic cells. This coating is provided by repeated immersion of the surface in a solution of the surfactant.

The two plates are next secured together with an epoxy edge seal 5 to form the display cell whose interior 6 is then filled with 4-cyano-4'-n-octyl biphenyl, a smectic A material with a positive dielectric anisotropy ($\epsilon_{41}$ = 11, $\epsilon_{40}$ = 5). The thickness of the resulting liquid crystal layer 6 is determined by the thickness of the edge seal and is typically made approximately 20$\mu$ thick.

The choice of the appropriate thickness of liquid crystal layer for a particular application is governed by a number of factors. Among these is the fact that the switching threshold voltage and switching speed are both reduced by changing to a smaller liquid crystal layer thicknes On the other hand such a change has the disadvantages that the scattering contrast ratio is reduced and the switching field strength is increased. This last mentioned effect sets a lower limit to the thickness at which the switching field strength approaches the dielectric breakdown field strength of the liquid. Thus for instance with the smectic material specified above it was found possible to switch a cell having a 10 $\mu$m thick layer, through such cells were rather vulnerable to irreversible breakdown through being switched with too great a voltage. Similar cells made with a 6 $\mu$m thickness layer were found to breakdown before the switching threshold was reached.

In an alternative construction of cell the homeotropic alignment is achieved by adding a suitable polar surfactant, such as the low viscosity polyamide resin sold under the designation Versamid 100, to the liquid crystal. In the case of this particular surfactant a concentration of 0.1% has been found suitable. An advantage of adding the surfactant to the liquid crystal, rather than applying it direct to the walls of the cell, is that the cell can be cnstructed first. This allows the use of a glass frit edge seal. In the first described construction an epoxy seal was used because the surfactant would not be able to withstand the firing temperatures of typical glass frits.

A third construction of cell dispenses with surfactants, and relies instead upon evaporated layers to induce homeotropic alignment. Obliquie evaporation to produce parallel homogeneous alignment of liquid crystals has been known for sometime. It is found however that normal incidence evaporation of suitable materials, such as silicon monoxide, silicon dioxide, alumina or titania will induce homeotropic alignment. Oblique evaporation at 30° to the plane will also produce homeotropic alignment in the case of evaporation made with alumina or titania. These evaporated homeotropic alignment inducing layers can withstand the firing temperatures of typical glass frits, and hence the epoxy edge seal can be replaced, if desired, with a glass frit edge seal.

Normally, when one of these cells is first constructed, the liquid crystal is found to be homeotropically aligned substantially throughout, but there may be a number of small scale scattering centres. These are believed to be caused by the formation of small focal-conic domains localised at small imperfections in the two confining major surfaces. They can be extinguished by the application of a suitable alternating low frequency electric potential between the opposed electrodes 3 and 4. This state may be characterised as an un-primed state since, although it can be switched to a dynamic scattering state by the application of a suitable low frequency alternating potential, this switching is very slow, and typically may take about an hour. Later, when the cell has been primed, it can be switched from homeotropic alignment to dynamic scattering in less than a second.

The left-hand portion of FIG. 2 indicates how the threshold voltage for inducing the transition from homeotropic alignment to dynamic scattering varies as a function of frequency. The threshold is also a function of layer thickness and so separate curves have been given for layer thicknesses of 59 $\mu$m, 31 $\mu$m and 21 $\mu$m respectively. From this figure it can be seen that the frequency used for stimulating this transition should preferably be not much greater than 100Hz because at higher frequencies the threshold voltage rises steeply towards an apparently asymptotic limit in the region of 1000Hz.

The cell is primed by applying a greater-than-threshold alternating potential across the cell and maintaining it until the regions between the opposed portions of the electrodes are totally switched into the dynamic scattering state. Dynamic scattering tends to nucleate at points along the periphery of the electrodes, and thereafter the area of scattering slowly broadens out to cover the whole area of overlap between the electrodes. There may also be some initial nucleation of scattering at localised points of the electrodes not at their periphery. It is believed that these latter are associated with local imperfections. The time taken for the scattering to spread over the full area of overlap will depend at least in part upon the shape and size of the overlap. A typical cell with a square area of overlap measuring 2cm by 2cm was found to be fully switched after a period of about three-quarters of an hour. The scattering of light directed through the cell is associated with turbulence occuring in a vertex pattern of molecular rotation with an average observed vortex diameter of about 0.4mm.

If when the cell has been fully primed the applied voltage is then steadily but slowly removed, or reduced to a value well beneath the switching threshold, over a period typically of about 1 to a few seconds, the turbulant scattering is removed, and the cell reverts to its clear state. If, however, the voltage is rapidly removed, as by the operation of a conventional snap-action mains switch, the dynamic scattering of the vortex turbulence is converted into a static scattering state induced by the formation of a high density of small focal-conic domains. Since, in the absence of any external stimulus, there is no tendency for the focal-conic domains to convert to laminar alignment, or vice versa, the resulting display has effectively an apparently indefinite persistence. The transition from the dynamic scattering state to the static scattering state is generally accompanied by a certain reduction of scattering power. Thus in a typical cell the dynamic scattering was found to reduce the transmission of light normally incident upon the cell by a factor of sixteen, but, when the power was removed in such a way as to replace the dynamic scattering with static focal-conic scattering, the transmission was reduced from a factor of sixteen to a factor of ten. The cell was then examined at intervals over a period in excess of 1,000 hours, and no change of scattering intensity was observed over the whole period.

Erasure of the focal-conic scattering regions can be achieved by thermal cycling. This requires the cell to be heated sufficiently to take the liquid crystal out of its smectic phase, and then for the cell to be cooled sufficiently for the material to be reconverted back into the smectic phase again. A drawback of this approach is that, after this method of erasure, the cell has to be primed once again.

Alternatively the focal-conic scattering regions can be erased by the application of a suitable alternating potential across the electrodes. The right-hand portion of FIG. 2 indicates how the threshold voltage for inducing this erasure varies as a function of frequency. The erasure threshold also resembles the writing threshold, discussed previously with respect to the left-hand portion of FIG. 2, in that it is a function of the thickness of the liquid crystal layer. Therefore separate curves have been included for the three respective layer thicknesses of 59 $\mu$m, 31 $\mu$m and 21 $\mu$m.

From FIG. 2 it can be seen that, particularly in the case of the thinner cells, there is a measure of overlap between the writing and the erasure threshold curves. Hence for the thinner cells there is a frequency range within which a single frequency may be used at one amplitude for erasing and at a greater amplitude for writing. In general however an increase of frequency is seen to reduce the erasure threshold. Nevertheless it is generally preferable not to go to too high frequencies for erasure because it has been found that above a certain limit apparently somewhere in the region of 5KHz the erasure is so complete that the cell has to be re-primed. Beneath this limiting frequency, erasure can be followed by a writing process that typically takes less than a second.

Both the speed of writing and the speed of erasing have been found to be highly voltage dependent. Thus for instance in tests made on a cell with a liquid crystal layer thickness of approximately 20 $\mu$m it was found that the writing time with a 200 volts r.m.s. signal at 50Hz was in the region of 80 msec, whereas when the signal strength was halved, the writing time jumped to the region 450 msec. In erasure the effect was found to be more pronounced. The same cell could be erased in about 90 msec using a 100 volts r.m.s. signal at 1KHz, whereas when the signal strength was halved, the erasure time jumped to about 3.2 seconds.

The foregoing results concerning writing and erasing threshold voltages and response times have been obtained with cells that have been constructed using transparent electrodes made by Optical Coatings Laboratories Inc (OCLI). When a cell was constructed using transparent electrodes made by Balzers it was unexpectedly found that its threshold switching characteristics were signficantly different from that of a comparable cell constructed with OCLI electrodes. These characteristics are represented in FIG. 3 in which the full lines relate to the characteristics of the cell made with OCLI electrodes and the broken lines relate to those of that made with Balzers electrodes. The reasons for the differences are not understood, though it is thought that they may be attricutable at least in part due to electrochemical differences at the liquid crystal electrode interface or differences of surface texture. If this is so, it is also possible that the characteristics may be significantly affected by the choice of method of obtaining homeotropic alignment . The foregoing results were obtained using cells in which homeotropic alignment were provided with hexadecyl trimethyl ammonium bromide surfactant.

The replacement of the octyl biphenyl liquid crystal material with the eutectic mixture of octyl and decyl biphenyls (58 wt. % octyl : 42 wt. % decyl) was found to give a wider temperature range of the smectic A phase, extending from 5° to 40° C., but it was also found that this was accompanied by an increase in switching threshold voltages.

These smectic cells may be modified to provide coloured contrast displays in the same way as cells relying upon the cholesteric-nematic phase change are modified for the same purpose. This modification relies on guesthost interaction and consists of dispersing a suitable pleochroic dye throughout the liquid. Smectics in general can be expected to be good hosts for plenchroic dyes because a typical smectic has a higher order parameter ($\sim$ 0.8) than a typical nematic or cholesteric ($\sim$ 0.7), and therefore should produce better alignment of the dye molecules, and hence a better contrast.

We claim:

1. A method of preparing and operating a dynamic scattering liquid crystal cell comprising the steps of:

providing a pair of glass plates having transparent electrodes thereon;

providing homeotropic alignment inducing medium in the space between said plates;

securing said electrode plates together with an edge seal;

filling the remainder of said space with a smectic material having positive dielectric anisotropy;

applying alternating electric potential between said electrode for both writing a display and for erasing said display;

wherein a liquid crystal display cell can be operated in a manner to provide for electrically reversal storage of information.

2. A method of operating a dynamic scattering liquid crystal display cell provided with internal electrodes and filled with a smectic liquid crystal having positive dielectric anisotropy incorporating a homeotropic alignment inducing medium for said smectic liquid crystal filling comprising both writing and erasing said display by applying an alternating electric potential between said electrodes.

3. The method as set forth in claim 2 wherein, in the region or regions between said opposed electrodes, said writing and erasing comprises driving said smectic liquid crystal material into a dynamic scattering state by the application of a first alternating electric potential; transforming said liquid crystal material into a focal conic scattering state by the removal of said first alternating electric potential; and subsequently restoring said liquid crystal material to a substantially non-scattering state by the application of a second alternating electric potential.

4. The method as set forth in claim 3 wherein said second alternating potential is applied at a higher frequency than said first alternating electric potential.

* * * * *